(12) United States Patent
Holmes

(10) Patent No.: US 6,945,894 B2
(45) Date of Patent: Sep. 20, 2005

(54) TWO RANGE ELECTRICALLY VARIABLE POWER TRANSMISSION

(75) Inventor: Alan G. Holmes, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 50 days.

(21) Appl. No.: 10/696,272

(22) Filed: Oct. 29, 2003

(65) Prior Publication Data

US 2005/0096170 A1 May 5, 2005

(51) Int. Cl.[7] ................................................. F16H 3/72
(52) U.S. Cl. .................................... 475/5; 475/151
(58) Field of Search ........................... 475/1, 2, 5, 149, 475/150, 151

(56) References Cited

U.S. PATENT DOCUMENTS

| | | | | |
|---|---|---|---|---|
| 5,904,631 A | * | 5/1999 | Morisawa et al. | 475/5 |
| 6,551,208 B1 | * | 4/2003 | Holmes et al. | 475/5 |
| 6,579,201 B2 | * | 6/2003 | Bowen | 475/5 |
| 6,743,135 B2 | * | 6/2004 | Klemen et al. | 475/5 |
| 6,827,165 B2 | * | 12/2004 | Schmidt | 180/65.2 |
| 6,852,054 B2 | * | 2/2005 | Tumback et al. | 475/5 |

FOREIGN PATENT DOCUMENTS

JP          2000-152412          * 5/2000

* cited by examiner

Primary Examiner—Ha Ho
(74) Attorney, Agent, or Firm—Christopher DeVries

(57) ABSTRACT

A vehicle powertrain has an electrically variable power transmission, which incorporates two electric power transfer mechanisms, a planetary gearset, an input clutch and an output clutch. A power source continually supplies power to the input clutch and the output clutch is continuously connectible with a transmission output mechanism. One of the planetary gear members is continuously connected with one of the electric power transfer mechanisms and a second of the planetary gear member is continuously connected with the second power transfer mechanism. The clutches are operable to connect the input shaft with two members of the planetary gearset during two ranges of operation and the output clutch is operable to connect two members of the planetary gearset with the output shaft during two ranges of operation.

4 Claims, 5 Drawing Sheets

TWO RANGE ELECTRICALLY VARIABLE POWER TRANSMISSION

TECHNICAL FIELD

This invention relates to power transmissions and, more particularly, to power transmissions including an engine, electric power transfer devices, and planetary gearing.

BACKGROUND OF THE INVENTION

Power transmissions are employed in vehicle powertrains to provide a plurality of ratios between the power source, such as an engine, and the final drive mechanism, such as a differential. These transmissions have taken on many forms including mechanically shifted or manual step ratio transmissions, planetary step ratio transmissions, and continuously variable power transmissions.

The continuously variable power transmissions generally include an adjustable belt drive, adjustable drive rollers, hydrostatic motor pump drives, or electrical power drives. The power split transmission also includes one or more planetary gearsets.

In more recent developments, it is proposed to use input-split power transmissions, output-split power transmissions, or compound-split power transmissions. Each of these power split type transmissions incorporate planetary gearsets.

SUMMARY OF THE INVENTION

It is an object of the present invention to provide an improved electrically variable transmission with both input-split and output-split operation.

In one aspect of the present invention, the transmission is employed in a powertrain having an engine, two electric power transfer mechanisms, a single planetary gearset, and a final drive mechanism.

In another aspect of the present invention, each of the electric power transfer mechanisms can be operated as either a motor or generator.

In yet another aspect of the present invention, the planetary gearset has incorporated therewith a pair of clutch mechanisms.

In still another aspect of the present invention, one of the clutches is an input clutch and the other is an output clutch.

In a further aspect of the present invention, the transmission incorporates a single planetary gearset having a sun gear member, a ring gear member, and a planet carrier assembly member.

In a yet further aspect of the present invention the input clutch is operable to connect the mechanical power source with either the planet carrier assembly member or the ring gear member.

In a still further aspect of the present invention, the output clutch is operable to connect either the ring gear member or the planet carrier assembly member with the transmission output member.

In a yet still further aspect of the present invention, one of the electric power transfer mechanisms is continuously connected with the sun gear member.

In still a further aspect of the present invention, the other of the electric power transfer mechanism is continuously connected with the planet carrier assembly member.

DESCRIPTION OF THE EXEMPLARY EMBODIMENTS

Figure 1:
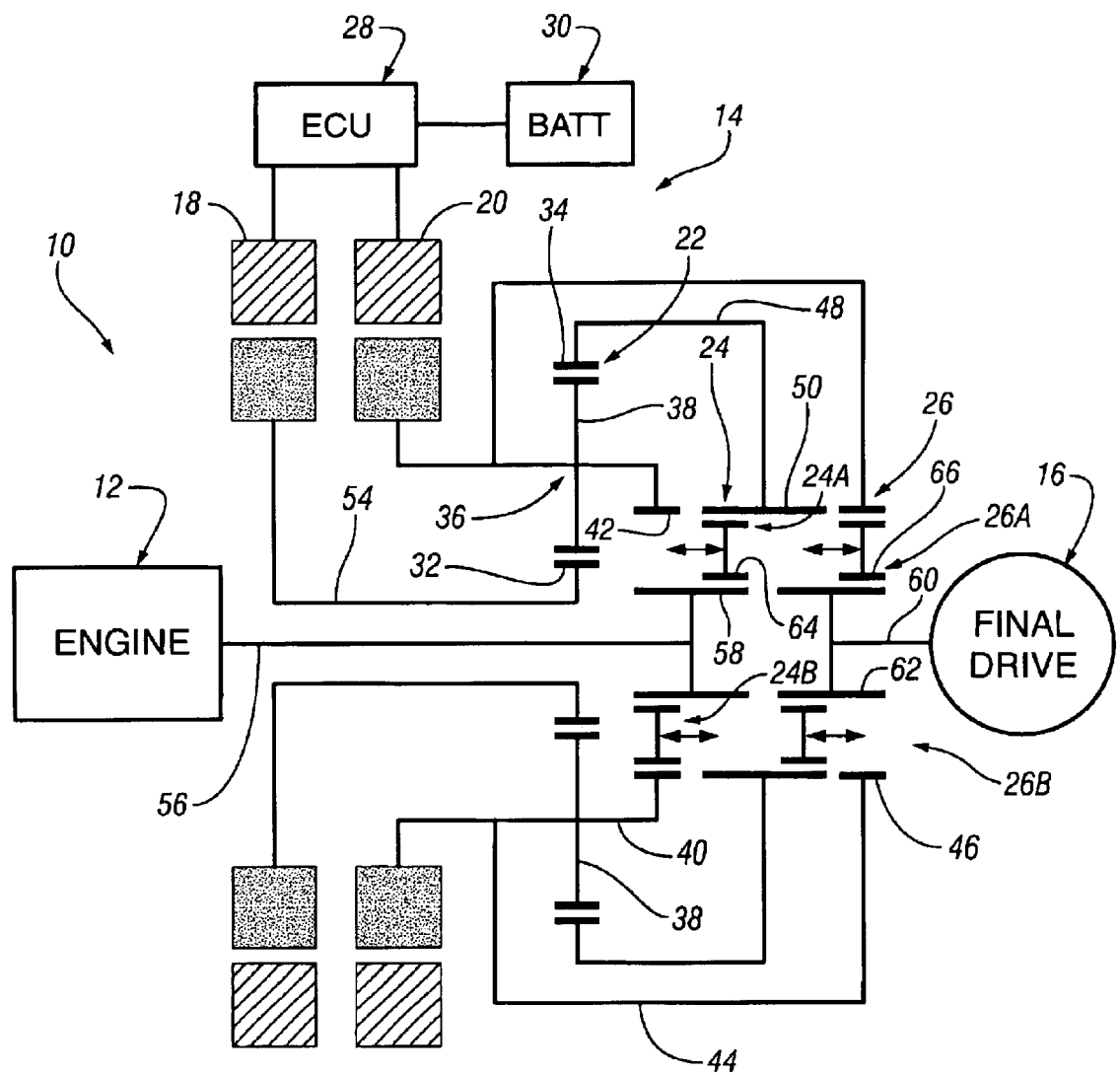
FIG. 1 is a schematic representation of a powertrain including a power transmission incorporating one embodiment of the present invention.

There is seen in FIG. 1 a powertrain 10 having an engine or prime mover 12, a power transmission 14, and a conventional final drive mechanism 16. The power transmission 14 includes a pair of electric power transfer mechanisms 18 and 20, a planetary gearset 22, an input clutch 24, and an output clutch 26.

The power transfer mechanism 18 is a conventional electric power transfer mechanism, such as a motor/generator (M/G). The electric power transfer mechanism 20 is also a conventional M/G unit. The motor/generators 18 and 20 are connected with a conventional electronic control unit (ECU) 28, which is also electrically communicated with a battery assembly 30. During the course of operation, the battery assembly 30 can supply power to and extract power from the motor/generator units 18, 20 through the electronic control unit 28. As is well known, electronic control units, such as 28, can incorporate a conventional preprogrammable digital computer, which is operable to control both the speed and power delivery and absorption of the motor/generator units 18 and 20.

The planetary gearset 22 includes a sun gear member 32, a ring gear member 34, and a planet carrier assembly member 36. The planet carrier assembly member 36 includes a plurality of pinion gears 38 that are rotatably mounted on a planet carrier member 40. The planet carrier member 40 has a clutch component 42, a hub element 44, and a second clutch component 46. The ring gear member 34 has a hub component 48 and a clutch component 50.

The sun gear member 32 is continuously drivingly connected through a shaft 54 with the M/G unit 18. The planet carrier member 40 is continuously drivingly connected with the M/G unit 20. The engine 12 has a shaft 56, which provides input power to the transmission 14. The shaft 56 is drivingly connected with a clutch component 58.

The final drive mechanism 16 includes a transmission output shaft 60, which is continuously drivingly connected with a clutch component 62.

The clutch 24 includes the clutch components 42 and 58, a portion of clutch component 50, and a clutch control mechanism 64. The clutch control mechanism 64 is operable to connect the clutch component 58 with the clutch component 42 or to connect the clutch component 58 with the clutch component 50. The clutch 26 includes the clutch component 46, the clutch component 62, a portion of the clutch component 50, and a clutch control mechanism 66. The clutch control mechanism 66 is operable to connect the clutch component 50 with the clutch component 62, or to connect the clutch component 46 with the clutch component 62. The clutches 24 and 26 are conventional clutch mechanisms, which can be either mechanical, hydraulic, or electric.

When the clutch 24 is in the position 24A and the clutch 26 is in the position 26A, the power transmission 14 is conditioned for an input-split ratio. During this operation, the engine 12, through shaft 56, drives the ring gear member 34 through the clutch 24 and the planet carrier member 40 drives the output shaft 60 through the clutch 26. This is an input-split combination within the powertrain 10.

When the clutch 24 is in the position 24B and the clutch 26 is in the position 26B, the engine 12 is drivingly connected with the planet carrier member 40 and the ring gear member 34 is drivingly connected with the output shaft 60 through the clutch 26. In this condition, the powertrain 10 is conditioned for an output-split operation.

The power transmission 14 has two ranges of operation. An input-split range of operation is provided when the clutch 24 is in the position 24A and the clutch 26 is in the position 26A, such that the engine 12 drives the ring gear member 34, the motor/generator 20 drives the planet carrier member 40, and the motor/generator 18 drives the shaft 54. A second range or output-split range of operation is provided when the clutch 24 is in the position 24B and the clutch 26 is in the position 26B. During this range of operation, the engine 56 and motor/generator unit 20 operate in unison to drive the planet carrier member 40. The motor/generator unit 18 drives the sun gear member 32 and the ring gear member 34 is connected with the output shaft 60.

The powertrain 10 operates through a wide range of vehicle speeds. The powertrain 10 may be operated at a cruise condition, which would provide maximum economy or at an acceleration or full engine speed condition, which would provide maximum vehicle acceleration.

Figure 2:
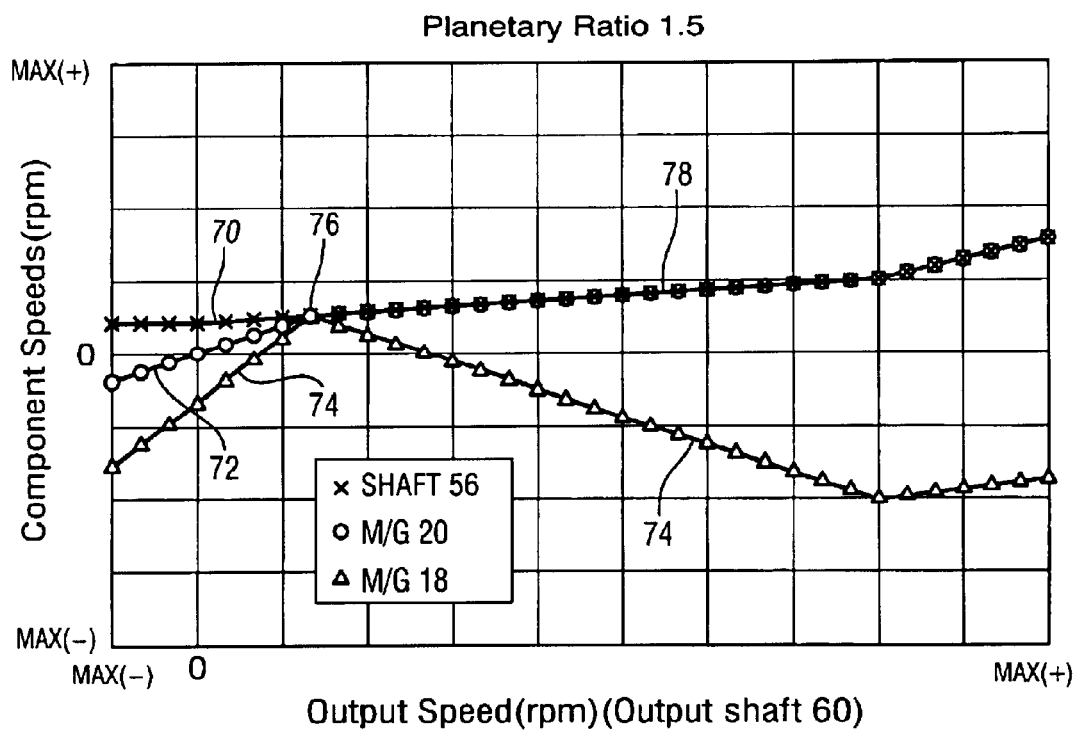
FIG. 2 is a curve or chart representing the speeds of some of the transmissions components relative to the transmission output speed. The input is representative of an engine operating at cruise speed.

The chart depicted in FIG. 2 describes the speed of the components when the ratio of ring teeth to sun teeth in the planetary gearset 22 is equal to 1.5 and when the powertrain is operated at a cruise condition. As seen in FIG. 2, the engine 12 and shaft 56 operate along the line 70, the M/G unit 20 operates along the line 72, and the M/G unit 18 operates along the line 74. These three lines converge at a point 76.

When this point is reached, the planetary gearset 22 is operating as a unit. That is, the speed of sun gear member 32, the planet carrier member 40, and the ring gear member 44 are all operating at the same speed. At this condition, the clutches 24 and 26 can be synchronously interchanged since their input and output speeds are identical. The operation to the left of point 76 represents an input-split condition with the clutches 24 and 26 having positions 24A and 26A, respectively. The operation to the right of point 76 represents an output-split condition with the clutches shifted to positions 24B and 26B, respectively.

Following this interchange the engine 12, input shaft 56, planet carrier member 40, and M/G unit 18 will operate in unison along line 78. The M/G unit 20 will continue to operate along line 74.

When the transmission 14 is operating in the input-split condition and when the M/G unit 18 is operating in a negative direction or at a negative speed, the M/G unit 18 is generally operating as a generator, which provides power to operate the motor/generator 20 in addition to the battery power. If all of the generated power of M/G unit 18 is not required to drive M/G unit 20, the excess power can be used to ensure that the battery assembly 30 is fully charged. The ECU 28 is, of course, operable to control the operating conditions of both the M/G unit 18 and the M/G unit 20.

When the powertrain 10 is operating to the right of point 76, an output-split transmission is provided within the power transmission 14. As described above, during this condition the engine 12 and M/G unit 20 operate in unison while the M/G unit 18 operates along the line 74. Also during the output-split operation, the M/G unit 18 generally operates as a motor when the speed thereof is negative or below the zero line.

Figure 3:
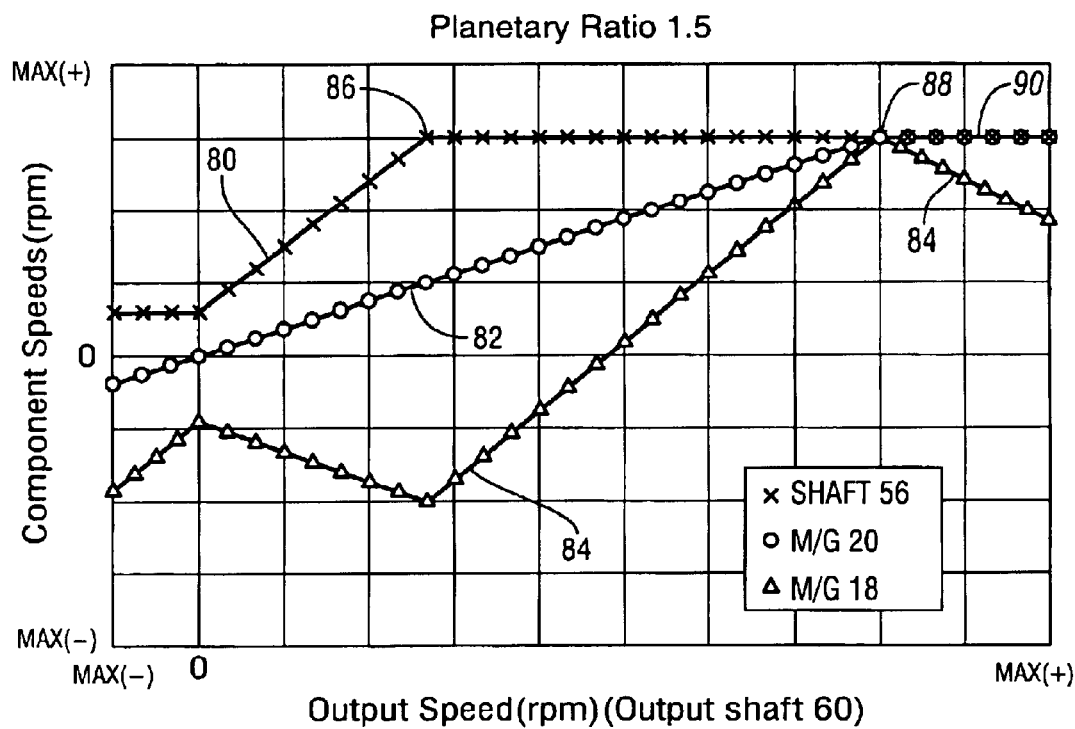
FIG. 3 is a curve or chart similar to FIG. 2 with the powertrain being operated at full power.

The chart of FIG. 3 describes the characteristic operating speeds of the engine 12 and shaft 56 as shown at line 80, the operating speeds of M/G unit 20 as shown at line 82, and the operating speeds of M/G unit 18 as shown at line 84. The operating condition shown in FIG. 3 is a condition under which maximum vehicle acceleration is attained by the powertrain 10.

As can be seen in FIG. 3, the engine accelerates to a maximum speed condition from idle to point 86, the M/G unit 20 accelerates along line 82 to the point 88, and the M/G unit 18 is operated under both a negative speed condition and a positive speed condition up to the point 88. At the point 88, the planetary gearset 22 is operating in unison such that an interchange can be made from the input-split operation to the output-split operation. As with the operation in FIG. 2 during an output-split operation, the M/G unit 20 and engine 12 operate in unison along line 90 while the M/G unit 18 continues along line 84.

There are conditions under which the M/G unit 18 will operate as a generator when driven in a positive direction as well as when driven in a negative direction. There are also conditions under which the M/G unit 20 will operate as a generator and the M/G unit 18 will operate as a motor. Under most conditions, when the M/G unit 18 is operating as a motor, the M/G unit 20 will operate as a generator. These units are sized such that the generating power of one unit is sufficient to supply the driving power of the other unit.

There are, however, times when both units will operate as motors under the maximum power requirement conditions shown in FIG. 3. During these rare conditions, the battery assembly 30 will supply power along with the engine 12 to provide operation of the vehicle. During these conditions, when the battery assembly 30 is supplying power, the M/G unit 20 will still act as a motor even when the M/G unit 18 is acting as a motor, and also M/G unit 18 will act as a motor when the M/G unit 20 is acting as a motor. These conditions require the input power from the battery assembly 30.

The driving conditions under which the action of the M/G units 18 and 20 operate as motors during full power conditions is partly determined by the unit as energy that is available from the battery. This is determined by the ECU 28 such that the vehicle will continue along a desired power curve, even though this power curve may be somewhat reduced from the maximum available power curve.

Figure 4:
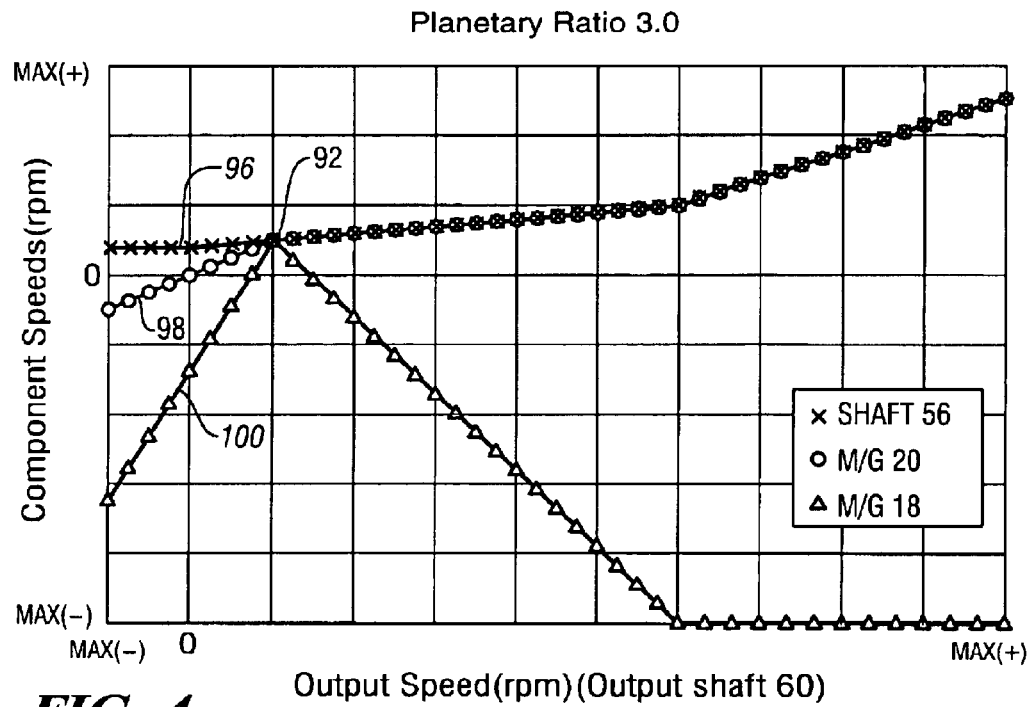
FIG. 4 is a chart similar to FIG. 2 wherein the ratio of the planetary gearset has been changed and the powertrain is operating at a cruise speed.

The chart found in FIG. 4 depicts the operating speed conditions of some of the transmission components when the ratio of the planetary gearset is 3.0 as opposed to the ratio of 1.5 found in FIGS. 2 and 3. The planetary ratio refers to the ratio of the number of teeth on the ring gear member divided by the number of teeth on the sun gear member. This is a common numerical value employed in the design of planetary gearsets in power transmissions.

Figure 5:
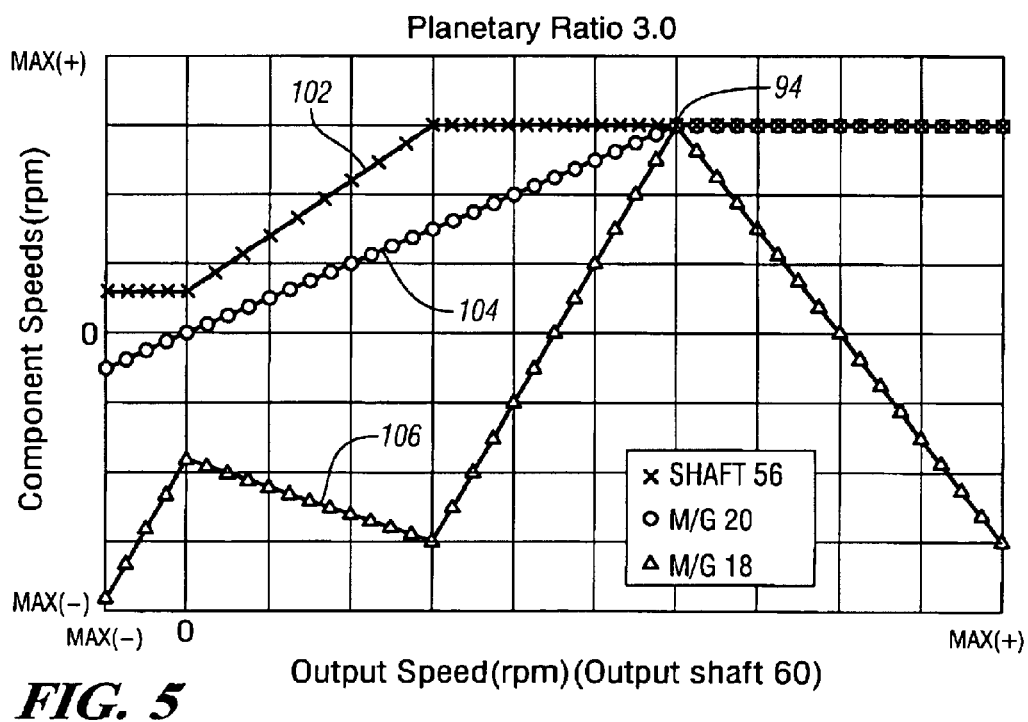
FIG. 5 is a chart similar to FIG. 3 having the planetary ratio similar or the same as FIG. 4.

As seen in FIG. 4, the units operate at a single speed at point 92 and in FIG. 5, the units operate at a single speed at point 94. The chart of FIG. 4 depicts the cruise condition relationship between the engine 12, motor/generator 18, and motor/generator 20. The engine 12 operates along the speed curve 96, the M/G unit 20 operates along the speed curve 98, and the M/G unit 18 operates along the speed curve 100. As noted to the right of point 92, the M/G unit 20 and engine 12 operate in unison.

FIG. 5 is a chart of the powertrain being operated at maximum acceleration conditions, again with a planetary ratio of 3.0. The engine 12 is operated along the line 102, the M/G unit 20 is operated along the line 104, and the M/G unit 18 is operated along the line 106. To the left of the point 94, the powertrain 10 is operating as an input-split mechanism, and to the right of point 94, the powertrain 10 is operating as an output-split mechanism.

Figure 6:
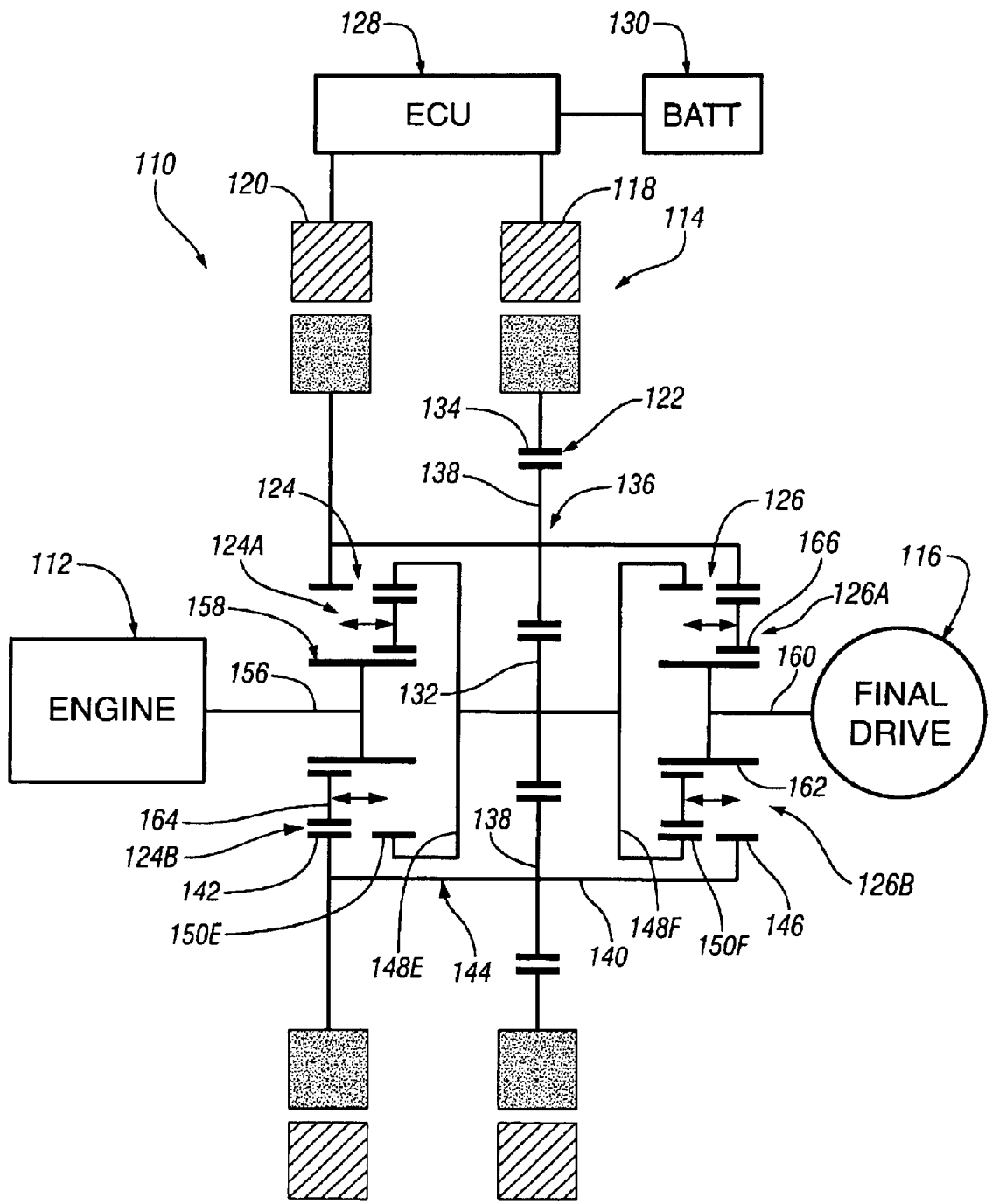
FIG. 6 is a schematic representation of a powertrain including a power transmission incorporating another embodiment of the present invention.

FIG. 6 depicts a powertrain 110 having an engine or prime mover 112, a power transmission 114, and a conventional final drive mechanism 116. The power transmission 114 includes a pair of electric power transfer mechanisms 118 and 120, a planetary gearset 122, an input clutch 124, and an output clutch 126.

The power transfer mechanism 118 is a conventional electric power transfer mechanism, such as a motor/generator (M/G). The electric power transfer mechanism 120 is also a conventional M/G unit. The motor/generators 118 and 120 are connected with a conventional electronic control unit (ECU) 128, which is also electrically communicated with a battery assembly 130. During the course of operation, the battery assembly 130 can supply power to and extract power from the motor/generator units 118, 120 through the electronic control unit 128. As is well known, electronic control units, such as 128, can incorporate a conventional preprogram able digital computer, which is operable to control both the speed and power delivery and absorption of the motor/generator units 118 and 120.

The planetary gearset 122 includes a sun gear member 132, a ring gear member 134, and a planet carrier assembly member 136. The planet carrier assembly member 136 includes a plurality of pinion gears 138 that are rotatably mounted on a planet carrier member 140. The planet carrier member 140 has a clutch component 142, a hub element 144, and a second clutch component 146. The sun gear member 132 has hub components 148E, 148F and clutch components 150E, 150F. The hub component 148E is connectable with the engine 112 through the clutch component 150E and the hub component 148F is connectable with the final drive 16 through the clutch component 150F.

The ring gear member 134 is continuously drivingly connected with the M/G unit 118. The planet carrier member 140 is continuously drivingly connected with the M/G unit 120. The engine 112 has a shaft 156, which provides input power to the transmission 114. The shaft 156 is drivingly connected with a clutch component 158.

The final drive mechanism 116 includes a transmission output shaft 160, which is continuously drivingly connected with a clutch component 162.

The clutch 124 includes the clutch components 142 and 158, a portion of clutch component 150E, and a clutch control mechanism 164. The clutch control mechanism 164 is operable to connect the clutch component 158 with the clutch component 142 or to connect the clutch component 158 with the clutch component 150E. The clutch 126 includes the clutch component 146, the clutch component 162, a portion of the clutch component 150F, and a clutch control mechanism 166. The clutch control mechanism 166 is operable to connect the clutch component 150F with the clutch component 162, or to connect the clutch component 146 with the clutch component 162. The clutches 124 and 126 are conventional clutch mechanisms, which can be either mechanical, hydraulic, or electric.

When the clutch 124 is in the position 124A and the clutch 126 is in the position 126A, the power transmission 114 is conditioned for an input-split ratio. During this operation, the engine 112, through shaft 156, drives the sun gear member 132 through the clutch 124 and the planet carrier member 140 drives the output shaft 160 through the clutch 126. This is an input-split combination within the powertrain 110.

When the clutch 124 is in the position 124B and the clutch 126 is in the position 126B, the engine 112 is drivingly connected with the planet carrier member 140 and the sun gear member 132 is drivingly connected with the output shaft 160 through the clutch 126. In this condition, the powertrain 110 is conditioned for an output-split operation.

The power transmission 114 has two ranges of operation. An input-split range of operation is provided when the clutch 124 is in the position 124A and the clutch 126 is in the position 126A, such that the engine 112 drives the sun gear member 132, the motor/generator 120 drives the planet carrier member 140, and the motor/generator 118 drives the ring gear 134. A second range or output-split range of operation is provided when the clutch 124 is in the position 124B and the clutch 126 is in the position 126B. During this range of operation, the shaft 156 and motor/generator unit 20 operate in unison to drive the planet carrier member 140. The motor/generator unit 118 drives the ring gear member 134 and the sun gear member 132 is connected with the output shaft 160.

Figure 7:
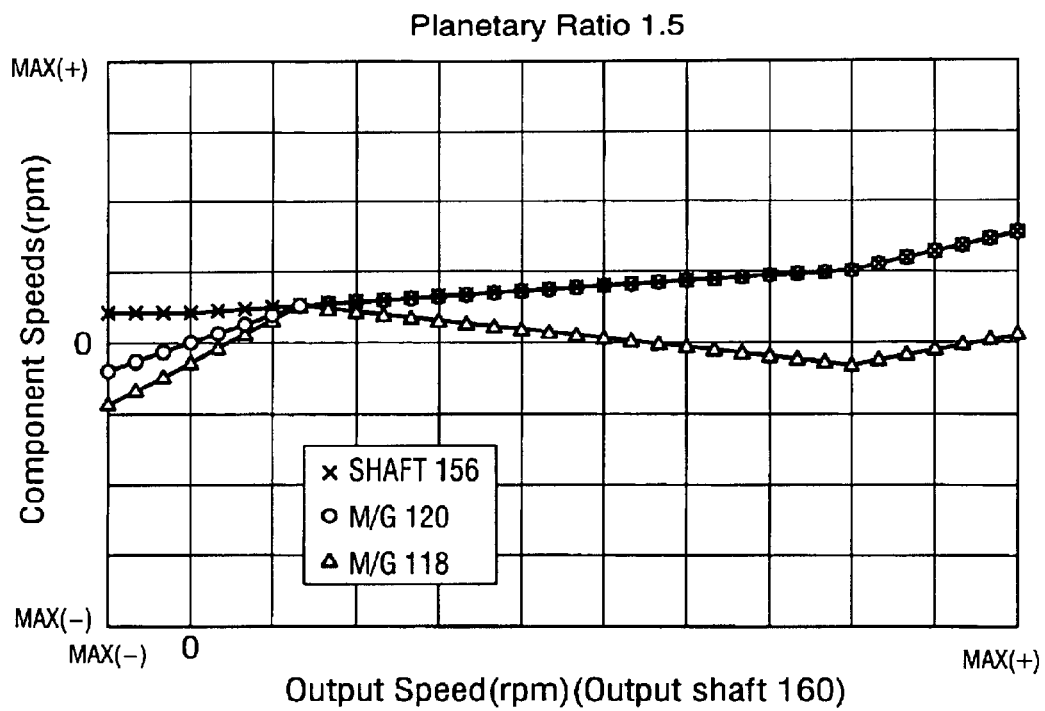
FIG. 7 is a chart similar to FIG. 2 with the input being representative of operation at cruise speed.
Figure 8:
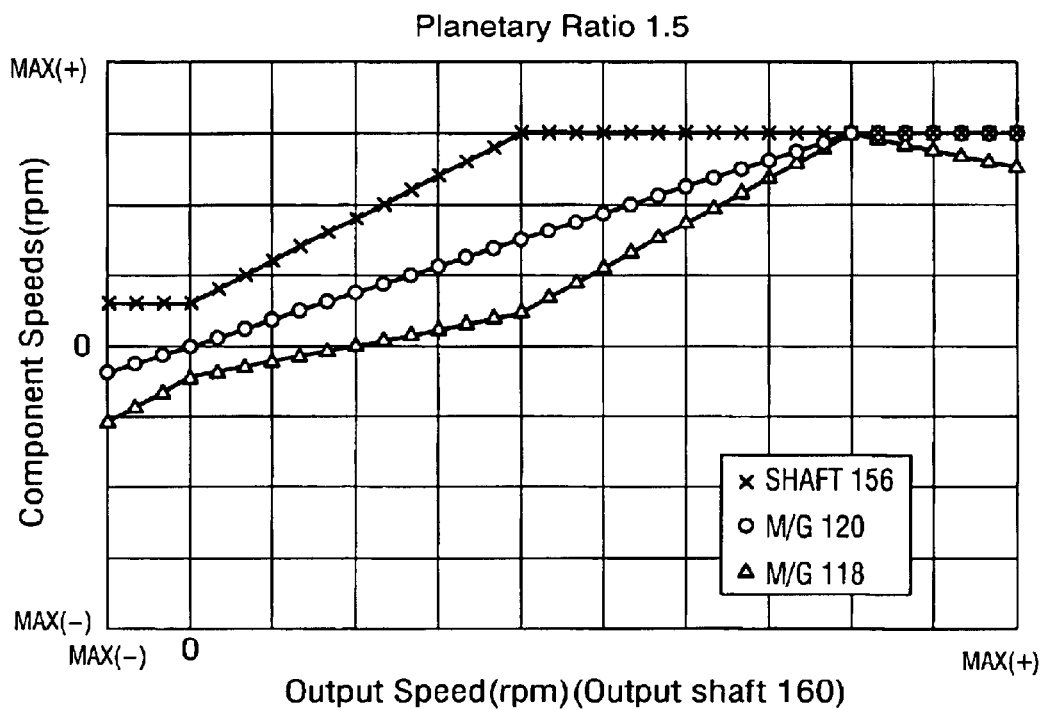
FIG. 8 is a curve or chart similar to FIG. 3 with the powertrain being operated at full power.

The powertrain 110 operates through a wide range of vehicle speeds. The powertrain 110 may be operated at a cruise condition, FIG. 7, which will provide maximum economy or at an acceleration or full engine speed condition FIG. 8, which will provide maximum vehicle acceleration. The operation of the power train in the cruise condition, FIG. 7, is similar to that described above in FIG. 2 and the full speed condition FIG. 8 is similar to that described above in FIG. 3. The planetary ratio of the sun gear 132 to the ring gear 134 has been chosen to be 1.50 for this example.

What is claimed is:

1. An electrically variable power transmission comprising:
    an input shaft;
    a first electric power transfer mechanism, a second electric power transfer mechanism, an input clutch, an output clutch, and a planetary gearset having a first member, a second member, and a third member;
    a transmission output shaft;
    said first member being continuously connected with said first electric power transfer mechanism, said second member being continuously connected with said second electric power transfer mechanism;
    said input clutch being selectively operable to interconnect said input shaft with said third member during a first range of operation and with said second member during a second range of operation; and
    said output clutch being selectively operable to connect said second member with said output shaft during said first range of operation and to connect said third member with said output shaft during said second range of operation.

2. The electrically variable power transmission claim 1, wherein the first member of said planetary gear set is a sun gear, the second member is a planet carrier, and the third member is a ring gear.

3. A powertrain for an automotive vehicle comprising:

an input shaft;

a first electric power transfer mechanism, a second electric power transfer mechanism, an input clutch, an output clutch, and a planetary gearset having a first member, a second member, and a third member;

a transmission output shaft;

said first member being continuously connected with said first electric power transfer mechanism, said second member being continuously connected with said second electric power transfer mechanism;

said input clutch being selectively operable to interconnect said input shaft with said third member during a first range of operation and with said second member during a second range of operation;

said output clutch being selectively operable to connect said second member with said output shaft during said first range of operation and to connect said third member with said output shaft during said second range of operation an engine which is connected to the input of said transmission, an electronic control unit connected to said first and second electric power transfer mechanisms of said transmission, and an electric storage battery connected to said electronic control unit, capable of storing electrical energy from said electric power transfer mechanisms and capable of supplying power for said electric power transfer mechanisms.

4. The electrically variable power transmission defined in claim 1 further wherein said first member of said planetary gearset is a ring gear, said second member is a planet carrier, and said third member is a sun gear.

* * * * *